United States Patent [19]

Grubbs et al.

[11] 4,274,739
[45] Jun. 23, 1981

[54] APPARATUS FOR MONITORING OPERATIONAL STATUS AND DIAGNOSIS OF ELECTRONIC VEHICLE WHEEL ALIGNMENT EQUIPMENT

[75] Inventors: Dean O. Grubbs, Manchester; James M. Grossman, Chesterfield, both of Mo.

[73] Assignee: Hunter Engineering Company, Bridgeton, Mo.

[21] Appl. No.: 66,846

[22] Filed: Aug. 15, 1979

[51] Int. Cl.³ .......................................... G01B 11/275
[52] U.S. Cl. ..................................... 356/155; 33/288; 340/286 M
[58] Field of Search ..................... 356/155; 33/203.18, 33/288; 340/286 M

[56] References Cited

U.S. PATENT DOCUMENTS 3,355,708  11/1967  Perry .............................. 340/286 M
4,095,902  6/1978  Florer et al. ......................... 356/155

Primary Examiner—R. A. Rosenberger
Attorney, Agent, or Firm—Gravely, Lieder & Woodruff

[57] ABSTRACT

Apparatus utilizing solid state electronic components embodying circuit varifying means in the form of lights which provide a quick indication of the operability of important circuits contained in the electronic vehicle wheel alignment equipment, and indicate which of several circuits is functional, so that service persons operating the alignment apparatus are able, upon visual inspection of the console panel, to determine whether the instruments on the vehicle are functioning properly to produce the needed alignment information.

4 Claims, 4 Drawing Figures

APPARATUS FOR MONITORING OPERATIONAL STATUS AND DIAGNOSIS OF ELECTRONIC VEHICLE WHEEL ALIGNMENT EQUIPMENT

BACKGROUND OF THE INVENTION

The importance of proper alignment of vehicle wheels is well recognized. In former years alignment apparatus was essentially mechanical. That type of apparatus responded upon physically doing something to the vehicle wheels. Later advances utilized light beams and charts, and in the last few years the apparatus has moved into electronics, combined with radiant energy and consoles equipped with meters, responsive to wheel position monitoring circuits.

It is important to the successful use of electronic alignment apparatus to know what circuits relate to which wheels. It is also important to be able to know, when switches are manipulated, that the circuits associated with the selected switch position are functional, as well as being the proper circuits for the particular alignment information sought.

BRIEF DESCRIPTION OF THE INVENTION

This invention pertains to circuit varifying signal generating means for vehicle wheel alignment apparatus.

An important object of the present invention is to provide signal generating means associated with the respective circuits related to vehicle front and rear wheel alignment measuring apparatus for varifying the operation thereof.

It is a further important object of the present invention to provide circuit varifying signal generating means for visually determining the source of generated information concerning vehicle wheel alignment conditions, where the alignment apparatus is primarily associated with read out meters and the like.

A further object of the present invention is to provide signal generating means for varifying electronic circuit operation and to arrange the signal generating means in a predetermined relationship with respect to the front and rear wheels of the vehicle being examined.

Another object of the present invention is to provide illumination type indicators which may be viewed by alignment service personnel over a wide range of viewing angles, and which are associated with alignment circuitry to indicate electrical malfunctions and non-functioning components of the alignment equipment.

It is also an object of the present invention to provide signal generators of illuminated type with high visibility and which function to indicate upon visual inspection whether or not the associated circuits are producing correct information.

BRIEF DESCRIPTION OF THE APPARATUS

The present invention is embodied in the accompanying drawings, wherein.

Figure 2:
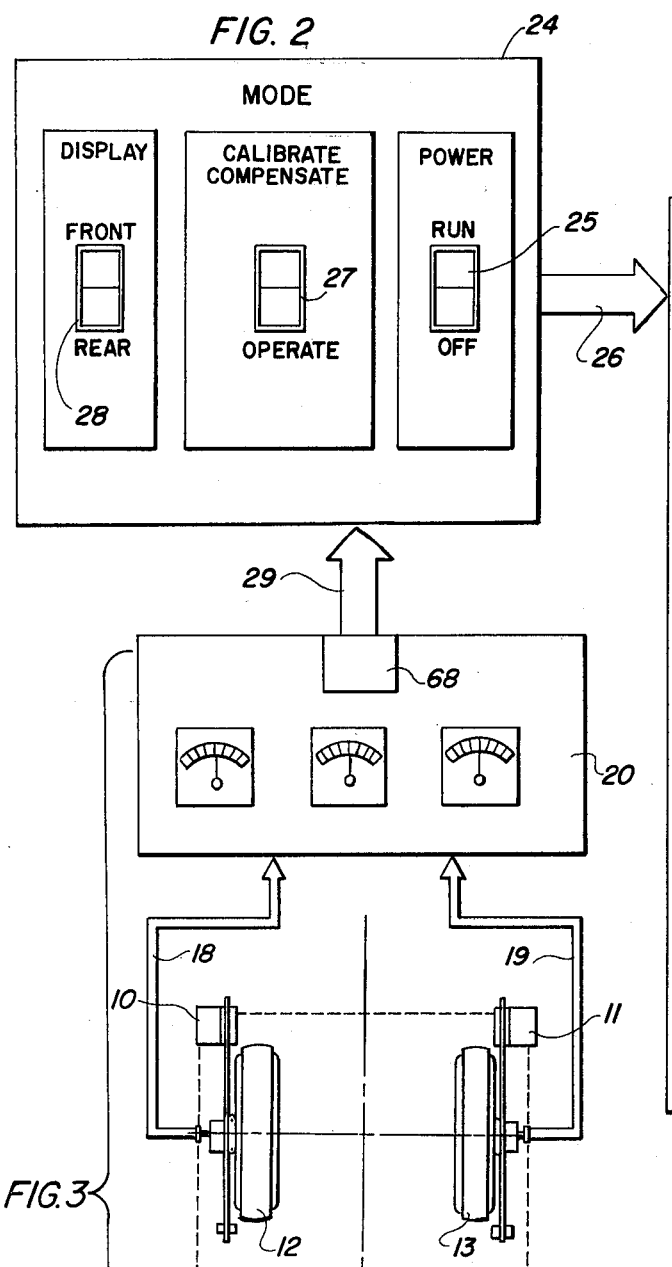
FIG. 2 is a face view of a control panel for circuits which process signals in accordance with switches for selecting the several modes of operation which in turn energize each of the varifying signals on panel of FIG. 1.
Figure 3:
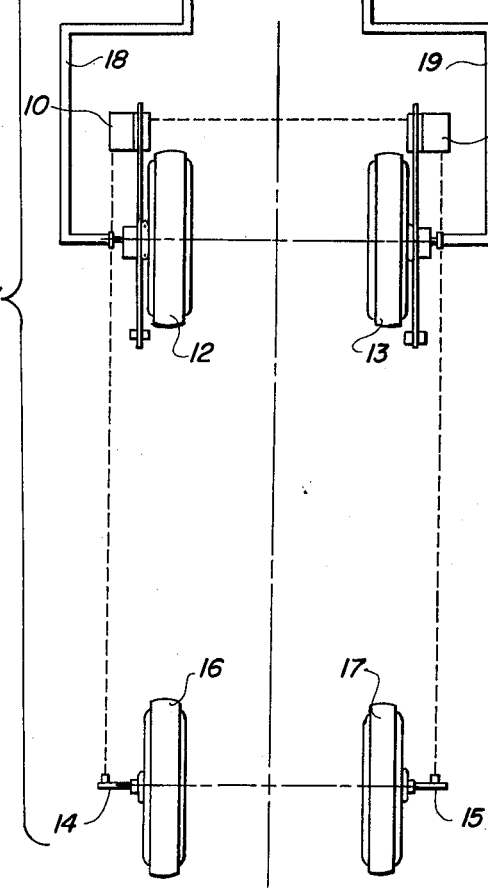
Figure 4:
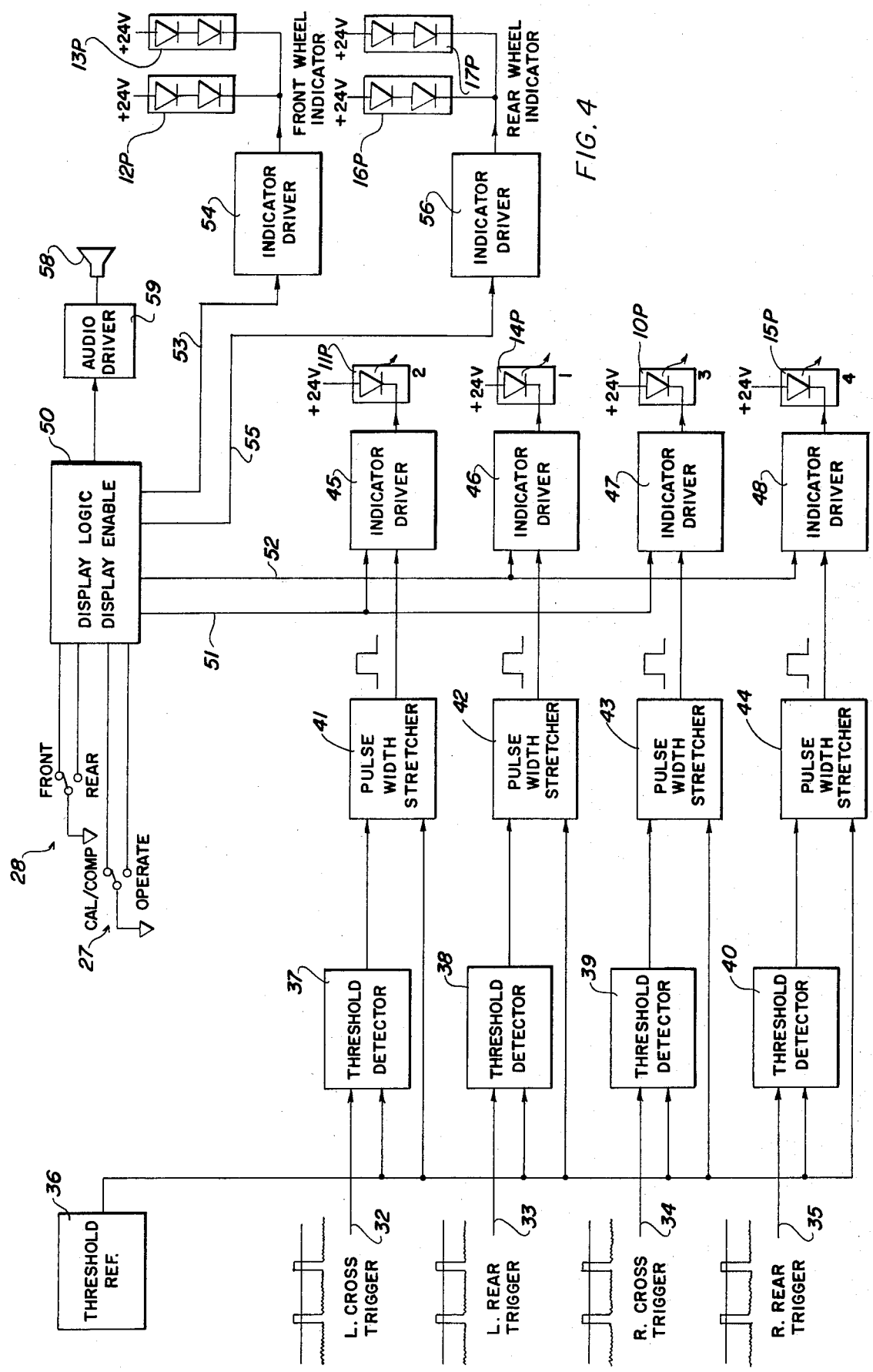

FIG. 3 is a brief diagram of the instrumentation mounted on a vehicle and the console operatively associated with that instrumentation for the purpose of illustrating the source of signals which are processed through the block diagram of a circuit contained in the housing for the control panel seen in FIG. 2; and FIG. 4 is a block diagram of the electronic components and circuit connections for the apparatus of this invention.

DETAILED DESCRIPTION OF THE INVENTION

The presently preferred or best mode of practicing this invention is illustrated in the drawings to which the following description relates. The essential informative signals which are to be processed in the varifying circuits and associated visual signals are expected to be derived from a source such as that described and claimed in the copending application of Hollandsworth et al, Ser. No. 967,072 filed Dec. 6, 1978 now U.S. Pat. No. 4,239,389. For present purposes FIG. 3 has just briefly set forth a diagrammatic layout of the vehicle wheels, instrumentation associated with the respective wheels, and the console containing the several circuits which develop information displayed at the meters.

Reference should be made to that copending application for full details, but for present purposes it is believed sufficient to understand from FIG. 3 that radiant energy beam projectors 10 and 11 project such beams across the tread width of the wheels 12 and 13, and also project such beams longitudinally to instruments 14 and 15 mounted on wheels 16 and 17. The several beams from projectors 10 and 11 are received in sensors in the latter projectors and generate signals transmitted by leads 18 and 19 into the console 20 where processing takes place and the results are displayed by meters. The signals flowing in lead 18 represent alignment information related to the right side wheel 13 and the left side wheel 16. Similarly, the signals flowing in lead 19 represent alignment information related to the left side wheel 12 and the right side wheel 17. The foregoing is set out briefly to furnish background information which will be useful to the appreciation of the present invention.

Figure 1:
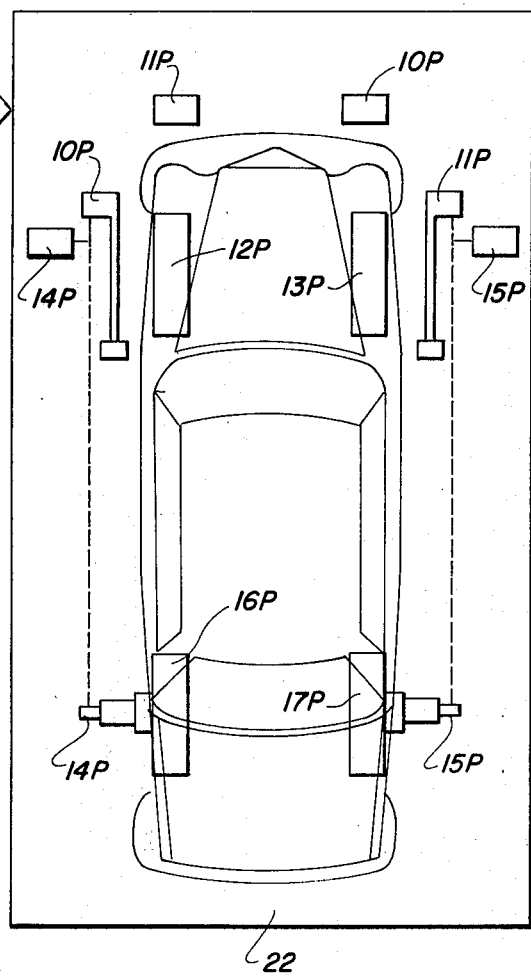
FIG. 1 is a face view of a panel containing the circuit varifying signal generating means associated with vehicle wheel alignment apparatus.

In FIG. 1 there is shown a panel 22 which supports circuit varifying signalling means associated with a diagrammatic outline of the wheels and instruments of the vehicle depicted in FIG. 3. The panel diagram thus lends realism to the alignment set up and brings out by visual inspection of panel 22 just what may be malfunctioning in the actual instruments installed on the corresponding wheels of the actual vehicle seen in the layout of FIG. 3. For example on the panel 22 the wheels 12P and 13P correspond to wheels 12 and 13 in FIG. 3, and wheels 16P and 17P correspond to wheels 16 and 17 in FIG. 3. The several representations of wheels 12P, 13P, 16P and 17P on panel 22 are in reality LEDs mounted in panel windows so as to be visible.

In like manner, the panel 22 depicts the radiant energy projectors 10 and 11 which carry beam sensing means. Since the projected beams are directed across as well as longitudinally of the vehicle, the panel 22 presents LEDs 10P and 11P which represent the transverse sensors related to wheels 10 and 11. Also the panel 22 presents LEDs 14P and 15P representative of the longitudinal sensors related to wheels 16 and 17. In this manner, the panel 22 is a duplicate of the vehicle wheels and instrumentation related thereto, and presents in one visual location an immediate over view of the alignment equipment location. The purpose for the panel 22 is to present in a small concentrated area means for varifying the validity of the information being obtained from the instrumentation applied to the actual vehicle, and to reveal where problems may be.

FIG. 2 is a view of a mode control panel 24 for the LED display shown on panel 22 and described above. As shown the panel 24 includes a power control switch 25 which has RUN and OFF positions. In the RUN position power is supplied to the various circuits in the housing (not shown) behind the panel 22. As will be described presently, the controls on panel 24 are connected by a plurality of leads 26 into the circuits behind the LEDs on panel 22. The panel 24 also incorporates a first mode selector switch 27 which has a position for calibrating and compensating purposes (CAL/COMP), as well as a position for placing the LEDs in panel 22 in an operate mode. A second mode selector switch 28 is provided for distinguishing between operation of the LEDs in panel 22 for front and rear wheel alignment information. The various circuits subject to the switches 25, 27 and 28 receive signals through leads 29 from the console 20 and leads 26.

What has been described above is an arrangement of equipment components which provide visual indications through a system of LEDs. Depending upon the setting of the mode switches at panel 24, the LEDs are related to signals through leads 29 to computation for front and rear wheel toe angles which is necessary in alignment work. The proper operation of the electronic measurement circuits in the console, which must be providing valid information in order to give correct alignment information, is being varified visually by the LEDs in panel 22. Thus, the LEDs have been arranged in an orientation on a vehicle diagram to make it easy for the operator to varify proper operation or to isolate trouble in the electronic system of console 20.

Turning now to FIG. 4, the circuit arrangement for the switches and visual LEDs in panels 22 and 24 is shown in a simplified block diagram. The circuits in lead 29 are separated out and are designated at the respective inputs 32, 33, 34 and 35. Each input will have the signal wave form indicated in which narrow signal peaks occur each time the sweep of the radiant energy beam is picked up by a sensor, while at other times the signal is merely a reflection of noise caused by ambient light. In order to prevent such noise interfering with the sensing of the desired signal, a threshold circuit 36 imposes on each signal detector 37, 38, 39 and 40 a restriction such that only the peak signal values are detected. The signal at lead 32 represents the sensing of the beam at the projector 10 which is projected from the projector 11. The signal at lead 33 is sensed at projector 10 as the beam returns from the reflective instrument 14 at wheel 16. In like manner, the signal in lead 34 is the signal sensed at projector 11 from the beam projected from projector 10, and the signal in lead 35 is the signal picked up at projector 11 as reflected by the instrument 15. The threshold signal level from circuit 36 is imposed on the incoming signal detectors 37 to 40 so that useful signal separation can be obtained.

In the system of FIG. 3, the positive going pulses generated each time the sweep of the beam in one direction is picked up at the sensor have an amplitude of the order of 15 to about 18 volts DC and a pulse width of the order of 2 to 5 milliseconds. The time of such a signal is too fast for the purposes of this invention, so to make the signals noticable under normal and certain other ambient light conditions, the circuits are each provided with pulse width stretcher means 41, 42, 43 and 44. Again, the threshold reference level control from the circuit 36 is applied to each stretcher means, with the result that the useful signal pulse are received in the respective LED driver circuits 45, 46, 47 and 48. In the view of FIG. 4 driver circuit 45 is connected to LED 11P, driver circuit 46 is connected to LED 14P, driver circuit 47 is connected to LED 10P, and driver circuit 48 is connected to LED 15P.

The circuit of FIG. 4 includes a display logic circuit 50 which is subject to control from the mode switch 27 and the display switch 28. The logic circuit 50 performs certain specific functions through its outputs 51 and 52 to the respective LED driver circuits 45 and 47 in the first case and LED driver circuits 46 and 48. In addition, the display logic circuit 50 has an output 53 connected to a driver circuit 54 connected to LEDs 12P and 13P. A further output 55 is connected to driver circuit 56 which is connected to LEDs 16P and 17P. The respective LEDs are wide angle view types which can be readily observed by service people over a wide range that does not require eyeing them from directly in front of panel 22. The functional requirement of the circuits of FIG. 4 are as follows.

Input signals are derived at leads 32, 33, 34 and 35 from an optical preamp module 68 in the electronic circuits in console 20. A signal pulse occurs each time the positive scanning energy beam from instruments 10 and 11 is received by the optical preamp circuit 68.

It should be understood that the LEDs are controlled so that they tend to remain energized, but are extinguished or caused to blink out each time a correct signal is impressed thereon. The pulse width stretcher circuits 41 to 44 are provided to increase the width of the correct signal so the "blink" can be made more noticable. Thus, a positive going pulse will trigger the circuits of FIG. 4 to extinguish or blink the LED for an interval of about 0.2 to 0.4 seconds. Anytime the input level rises about 7 to 7.5 VDC the circuit is charged to cause the LEDs to extinguish or blink, and the blink will persist all the while that the input level is about 7 to 7.5 VDC. When the signal level remains above 7 to 7.5 VDC the LEDs will remain continuously off. The fact that the response of the circuit 50 causes diversity of visual LED displays for the different input signal conditions permits the service person to readily determine the cause of an incorrect measurement signal. This unique feature can be employed for using the LED display responses for diagnostic trouble shooting of the equipment. The display can also be used to determine if the instruments 14 and 15 (FIG. 3) are properly mounted, as they will prevent LEDs 14P and/or 15P from giving the correct repetitive blinking signals.

In FIG. 2, when the switch 27 is in the CAL/COMP position only the input signals from leads 32 and 34 will cause LEDs 11P and 10P to blink. At the same time, if switch 28 is in the FRONT position, the LEDs 12P and 13P will be illuminated in a steady state. The switch 27 needs to be in the CAL/COMP position during the calibration of the instrument of FIG. 3, but if switch 28 is in the REAR position all of the LEDs will be extinguished to show that this setting is not valid. It is possible to include a suitable audible alarm device 58 connected to a driver 59 to annunciate this latter condition. The display on panel 22 performs several useful functions as follows. With the power switch 25 in the RUN position, and the switch 27 in the OPERATE position, the switch 28 will be operative to energize the front LEDs 12P and 13P, or when in the rear position to energize the LEDs 16P and 17P. This arrangement will show the operator whether the alignment information is obtained with respect to the wheels 12 and 13, or with respect to wheels 16 and 17. In either case, the LEDs 10P, 11P, 14P and 15P will normally be blinking to show the operator that the instruments of FIG. 3 are producing correct information. If the sweep of a beam from either projector 10 or 11 is blocked, the LED responsive to such beam will stop blinking and indicate that incorrect information is being received in the console 20.

The foregoing description has set forth presently preferred apparatus for monitoring the operating conditions of vehicle wheel alignment apparatus as shown in FIG. 3 for generating signals responsive of the alignment of the vehicle wheels, said signals being transmitted into the circuits contained in the console 20, and picked up therefrom and transmitted by the circuit leads 29 for use in the circuits and instrumentation shown in FIG. 4. In the latter disclosure a first arrangement of monitoring means is provided at LEDs 12P, 13P, 16P and 17P which are responsive of the vehicle wheel locations, and there is a second arrangement of monitoring means shown at LEDs 11P, 14P, 10P and 15P which are responsive of the alignment apparatus associated directly with the vehicle wheels as shown in FIG. 3. It has been pointed out that circuit means 29 is provided for transmitting all of the signals generated by the vehicle alignment apparatus, and in FIG. 4 logic means 50 is connected to the second monitoring means 11P, 14P, 10P and 15P for operating the latter means to monitor the correct or incorrect conditions of the alignment apparatus, and the logic means is also connected to the first monitoring means 12P, 13P, 16P and 17P. The logic means is provided with first selector means 28 associated with the first monitoring means as above-identified so that either a front or a rear set of the monitoring means will be represented, and second selector means is related with said logic means for operatively relating the second monitoring means with the detecting circuit means 29 as represented by the responsive inputs 32, 33, 34 and 35.

What is claimed is:

1. In display apparatus associated with alignment equipment on the front and rear vehicle wheels producing signals representing the operation of the alignment equipment at the wheels; a panel presenting to viewing by vehicle service persons a diagrammatic representation of the vehicle wheels and the alignment equipment thereon; first radiant energy display means positioned adjacent each of the wheel positions in said diagrammatic representation presented by said panel; second radiant energy display means spaced around the representation of the vehicle on said panel for monitoring the alignment equipment operation; and means interconnecting said alignment equipment and said first and second radiant energy display means including display logic circuit means and mode selection means connected to said first and second radiant energy display means for selectively indicating which of the alignment equipment is being monitored and causing said associated radiant energy display means to blink during proper operation of said equipment.

2. Apparatus for monitoring the operating conditions of vehicle wheel alignment equipment through signals generated by the alignment equipment comprising: circuit means for detecting the signals generated by the alignment equipment; signal threshold control means connected into said signal detecting circuit for substantially eliminating signal interference; radiant energy display means representative of the alignment equipment associated with the vehicle wheels; control logic means connected to said display means for operating said display means to reveal the status of the alignment equipment, and selector means operatively relating said control logic means with said display means, said selector means having switching means to determine the desired alignment equipment signals for monitoring by said monitoring display means.

3. The apparatus set forth in claim 2, wherein said display means are radiant energy beams for commanding visual attention, and said control logic means causes said display means to be interrupted periodically.

4. Apparatus for monitoring the operating conditions of vehicle wheel alignment equipment applied to the front and rear wheels of a vehicle through signals generated by the alignment equipment, said apparatus comprising: circuit means for detecting the signals generated by the alignment equipment and containing means to set the threshold value for each detected signal and means to increase the visual response of each of the detected signals; visual display means for each of the detected signals; selector means for selecting predetermined ones of the vehicle wheels for alignment equipment monitoring purposes; control logic means operatively relating said signal detecting circuit means with said selector means for energizing certain ones of said visual display means associated with said predetermined ones of the vehicle wheel alignment equipment, said energizing of said certain ones of said visual display means being interrupted periodically during proper operation of the alignment equipment and being uninterrupted during improper operation of the alignment equipment; and visual monitoring means representative of the vehicle wheel locations connected into said control logic means to be responsive to said selector means.

* * * * *